G. W. HOWE.
ANIMAL TRAP.
APPLICATION FILED MAY 24, 1919.
1,310,340.
Patented July 15, 1919.
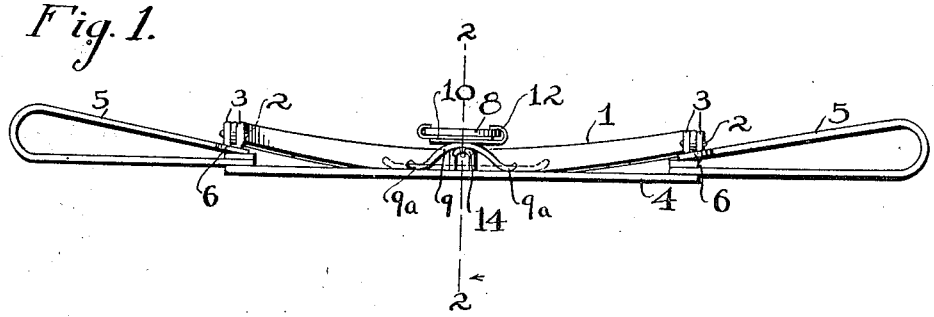
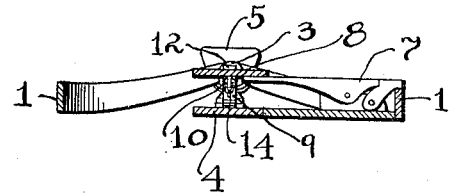
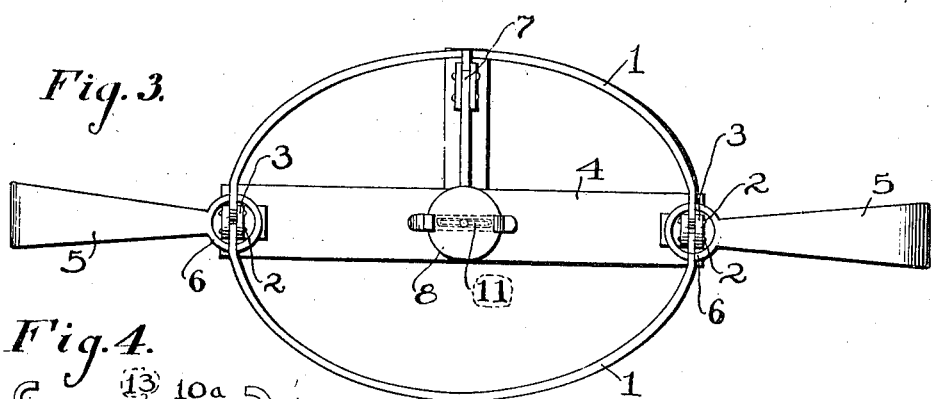
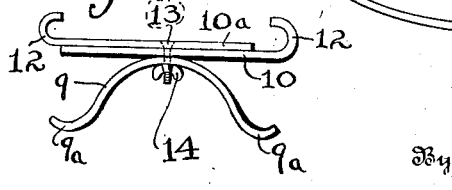
Inventor
GRANT W. HOWE.
By H. S. Hill
Attorney

UNITED STATES PATENT OFFICE.

GRANT WELLINGTON HOWE, OF HORNEPAYNE, ONTARIO, CANADA.

ANIMAL-TRAP.

1,310,340. Specification of Letters Patent. Patented July 15, 1919.

Application filed May 24, 1919. Serial No. 299,545.

*To all whom it may concern:*

Be it known that I, GRANT WELLINGTON HOWE, a subject of the King of Great Britain, residing at Hornepayne, in the Province of Ontario, Dominion of Canada, have invented a new and useful Animal-Trap; and I do hereby declare the following to be a full, clear, and exact description of the invention, such as will enable others skilled in the art to which it appertains to make and use the same.

The present invention relates in general to steel animal traps, and more particularly to a light spring support for the plan which controls the trip mechanism, the object of the invention being to provide a device of this character which can be applied as an attachment to the pan of any conventional steel trap, and which will prevent small animals such as marten, squirrels, weasels and the like from springing traps set for larger animals such as fisher, lynx, wolves and bear.

Further objects of the invention are to provide a device of this character which is simple and inexpensive in its construction, which can be attached without difficulty to the pan of any steel trap, and which will effectively prevent the trap from being sprung by a small animal without interfering in any manner with the proper operation of the trap when a larger animal steps upon the pan.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a longitudinal sectional view through a conventional steel trap, the pan thereof being supported by a spring attachment which is constructed in accordance with the invention.

Fig. 2 is a transverse sectional view through the trap, said view being taken on the line 2—2 of Fig. 1.

Fig. 3 is a top plan view of the trap.

Fig. 4 is an enlarged detail view of the pan supporting attachment, showing the same as detached.

Corresponding and like parts are referred to in the following description and indicated in all the views of the drawings by the same reference characters.

For the purpose of illustration the invention is shown as applied to a steel trap which is of the conventional construction, said trap including a pair of jaws 1 which are pivotally connected at 2 to ears 3 which project upwardly from opposite ends of the base plate 4. The usual springs 5 are arranged at opposite ends of the base and have eyes 6 which engage the pivoted ends of the jaws. The jaws are held in an open position when the trap is set by means of a trip device 7 which is controlled by a pan 8, said pan being positioned over the base plate 4 at substantially the center of the trap so that it is practically impossible for an animal to come into contact with the pan and press it downwardly to release the trip mechanism without being in position to be gripped by the jaws 1 when the latter are forced into a closed position by the springs 5. When traps of this character are set for larger animals it not infrequently happens that smaller and practically worthless animals succeed in pressing the pan downwardly and springing the trap, thereby setting the efforts of the trapper at naught. Much annoyance and loss of time is occasioned in this manner, and trappers frequently attempt to overcome the difficulty by placing bent twigs under the pan of the trap. However, this expedient is rather uncertain in its results and very unsatisfactory, since it is practically impossible to obtain and set a bent twig which has exactly the proper resiliency and will maintain that resiliency for the necessary length of time.

According to the present invention a light bowed spring strip 9 is interposed between the pan 8 and the base 4, the free ends of the bowed strip being curved outwardly at $9^a$ and bearing slidably against the base 4, while the intermediate portion of the strip is bulged upwardly under the pan 8. Suitable means such as a clamp 10 may be provided for securing the spring to the pan 8. This clamp is shown as formed of a pair of telescoping slides $10^a$ which have the overlapping portions thereof slotted at 11, the outer ends of the slides being returned upwardly to provide jaws 12 which are adapted to grip the pan 8 on opposite sides thereof. A clamping screw 13 extends through the slotted portions 11 of the two slides $10^a$ and also through an opening at the middle of the bowed spring 9, the lower end of the screw having a nut 14 fitted thereon. The slides 10ª can be telescoped and adjusted to bring the jaws 12 into engagement with the edges of a pan 8 of any conventional trap, after which the nut 14 can be tightened and the parts securely clamped in operative position. The arms of the bowed spring strip 9 can be flexed and bent to position them in the proper manner to hold the pan at the correct elevation. The resiliency of the bowed spring strip 9 is just sufficient to support the pan 8 and prevent it from being depressed by any of the smaller animals such as squirrels and weasels, without interfering in any manner with the springing of the trap by a larger animal. The device is simple and inexpensive in its construction and with the present construction can be quickly adjusted and fitted to the pan of any conventional steel trap.

Having thus described the invention, what I claim as new and desire to secure by Letters Patent, is:—

1. A spring support for the pans of steel animal traps, including a clamp formed with telescoping slides provided with jaws adapted to engage the edges of the pan, said clamp being adjusted to fit different sizes of pans, and a light spring carried by the clamp and interposed between the pan and the base of the trap.

2. A spring support for the pans of steel animal traps, including telescoping slides having the inner overlapping ends thereof correspondingly slotted, while the outer ends thereof are provided with pan engaging jaws, a bowed leaf spring, and a clamping screw extending through the slotted portions of the slides and the middle of the leaf spring for holding the slides in an adjusted position and securing them to the leaf spring, the jaws being adapted to engage the pan of the trap, while the leaf spring is adapted to be interposed between the pan and the base of the trap.

In testimony whereof I have signed my name to this specification in the presence of two subscribing witnesses.

GRANT WELLINGTON HOWE.

Witnesses:
MARY ALICE HOWE,
E. L. ALDRICH.